April 13, 1937. R. PEALE 2,076,915
MECHANISM FOR SEPARATING INTERMIXED DIVIDED MATERIALS
Original Filed Sept. 16, 1927 7 Sheets-Sheet 1

April 13, 1937.  R. PEALE  2,076,915
MECHANISM FOR SEPARATING INTERMIXED DIVIDED MATERIALS
Original Filed Sept. 16, 1927  7 Sheets-Sheet 5

INVENTOR.
R. Peale
John D. Morgan
ATTORNEY.

Patented Apr. 13, 1937

2,076,915

UNITED STATES PATENT OFFICE 2,076,915

MECHANISM FOR SEPARATING INTERMIXED DIVIDED MATERIALS

Richard Peale, St. Benedict, Pa., assignor, by mesne assignments, to Peale-Davis Company, Wilmington, Del., a corporation of Delaware Application September 16, 1927, Serial No. 219,976
Renewed May 2, 1935

3 Claims. (Cl. 209—469)

The invention relates to a novel and useful mechanism for separating practically entirely and completely intermixed, divided materials, which materials vary relatively little in their specific gravities, while the pieces, fragments, particles, or other divisions of the intermixed materials vary relatively very greatly in size.

Objects and advantages of the invention will be set forth hereinafter in part, and in part will be obvious herefrom or may be ascertained through practicing the invention; the same being realized and obtained through the means and instrumentalities pointed out in the appended claims.

The invention consists in the novel constructions, combinations and improvements herein shown and described.

The accompanying drawings, herein referred to and constituting a part hereof, illustrate one manner of carrying out my invention, and the present preferred embodiment of a mechanism for so doing, said mechanism also embodying the mechanical principles of my invention; the drawings together with the description likewise serving to explain the principles of the invention.

The invention is directed primarily to effecting as nearly as possible a complete separation of intermixed materials, the pieces or particles of which vary relatively very widely in size and vary relatively very little in their specific gravities, so as to effect solely by the operation of my process and apparatus an unusually complete and substantially perfect separation of one of the intermixed materials, whereby one of the materials is delivered as a commercially clean product, and may be shipped directly to the market from the cleaning table.

One important object attained by my present invention it to remove almost absolutely one or more of the materials of an intermixture so as to leave one of the ingredient materials practically completely free from the others, which commercially are regarded as impurities. Where the percentage of such impurities in the intermixture is relatively large, even a high percentage efficiency of separation might leave a residual which in absolute quantity might be commercially objectionable, and my invention is directed among other things to such a condition and to effect the substantial complete elimination of such impurities according to strict commercial requirements. The terms "lighter" and "heavier" are used herein to designate the relative specific gravities of the materials and do not refer to the relative mass or weight of pieces or particles of the various materials.

Machines and processes are well known for separating finely particulate, and therefore substantially uniformly sized, intermixed materials, varying very widely in their specific gravities, but this problem is an exceedingly different one from the separation of particulate or fragmentary materials, having relatively little difference in their specific gravities, and varying relatively exceedingly greatly in size, as for instance from the finest dust of the various intermixed materials up to pieces say having dimensions of four inches.

This dimension is stated not as a limitation on my invention, but to give a clear idea of the capacity of my table in perfecting very difficult and exacting separation of such intermixed materials. The difficulty of effecting clean commercial separation of this kind is further enhanced by the fact that frequently the materials are adherent in single pieces, which renders more difficult the separation by means relying wholly or in part on the difference in specific gravities.

A very important class of materials requiring separation, and a class to which my invention, in certain of its aspects, is more particularly addressed, is a mixture of coal, rock, bony, sulphur and other impurities, as it comes from the mine, (usually styled "run of the mine"), the only preparation being to crush large lumps, which in any event would damage the mechanism, and to practically completely separate out all the impurities from the coal, from the finest dust to the largest pieces, the coal being shipped directly from the table into the car through automatic conveyor mechanism. This feature of my invention is directed also to successfully handling the cleaning problem where run of the mine coal contains a very high percentage of impurities, but where the coal must be separated out with the free impurities practically totally removed in order to meet the strictest commercial requirements. By my invention, as previously stated, the run of the mine coal, exclusive of very large lumps, is run over a single cleaning table, without any preliminary screening, and the practically completely cleaned coal is delivered from the table into the railway cars.

The present preferred embodiment of my invention comprises a relatively long and narrow table, the intermixed materials being fed to the rear end of the table, and preferably entirely across it. The table is provided with rear and side bed retaining walls, so that a continuous bed of the intermixed materials may be maintained thereon, gradually undergoing separation as it at the same time moves forwardly along the table. The table is provided with separating partitions, beginning at the rear and one side wall of the table, and extending forwardly and toward the other side wall, these partitions serve to direct the heavier and non-buoyant material (which has stratified beneath and has settled upon the table deck, and is thence progressable by gravity and inertia) out of the bed by the quickest and most direct path. These separating partitions terminate short of the farther bed retaining side wall to leave an unobstructed, longitudinally-disposed channel for the separated and settled rock and other impurities, which rock channel is practically outside of the bed of materials which is still progressing and stratifying. The table proper is air-pervious, usually uniformly throughout, and the bed is subjected to relatively powerful pulsating buoying or lifting air action, and the table is mechanically longitudinally reciprocated through a very short path. At the front end of the table, a relatively exceedingly long and diagonally disposed spillage edge for the coal or other purified superior stratum is provided, this edge preferably running back at its rear end approximately to the middle of the total length of the table. The settled heavier impurities, such as rock, sulphur, etc., as soon as they settle upon the table are impelled by friction and inertia immediately out of the bed at the earliest point into a rock channel which in practical operation is outside the bed and extends along one lower exterior side edge thereof, whereby the impurities so expelled are not under impulsion to return into the bed, and further settled impurities may be immediately and directly discharged into this separate rock channel.

I preferably also immediately deliver the heavier impurities, and also an intermediate product consisting largely of impurities to a second table which is mechanically independent of the first table, that is, having its direction and amplitude of vibration different and reverse from the first table and also the form and inclination of its deck widely different. This mechanical independence of the second table is essential to its efficiency, as the problem on this table is to separate materials in which the quantity of the heavier material or materials is relatively very great.

The foregoing general description, and the following detailed description as well, are exemplary and explanatory of the invention, but are not restrictive thereof.

Figure 5:
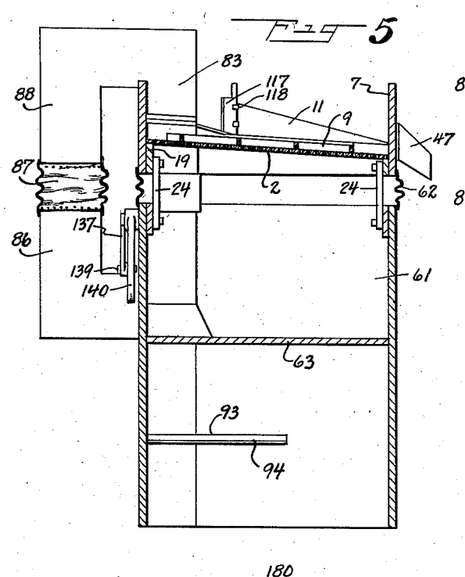
Fig. 5 is a vertical transverse elevation, on an enlarged scale, taken on the line 5—5 of Fig. 1.
Figure 6:
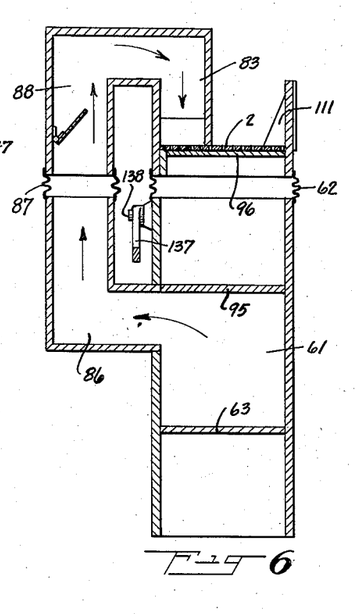
Fig. 6 is a transverse vertical elevation, on an enlarged scale, taken on the line 6—6 of Fig. 1.

Referring now in detail to the embodiment of the invention illustrated by way of example in the accompanying drawings, a cleaning table 1 is provided with an air-pervious bottom or deck 2, upon which a continuous bed of the intermixed materials is maintained, and is continually progressed forwardly as a bed, the stratification and separation of the materials likewise proceeding progressively, the separated and stratified materials being delivered at the forward end of the table. A bed retaining wall 5 is provided at the rear end of the table, and a bed retaining wall 6 is also provided along one entire side edge of the bed, and a bed retaining wall 7 along the other side edge of the table. To provide at the front end of the table a relatively very long spillage or discharge edge for the coal or other superior purified stratum, this front end is obliquely disposed at a relatively gentle angle to the length of the table, as best shown at 8 in Fig. 1, the rear end of this spillage edge 8 extending about half way backwardly of the length of the table. This spillage edge may be entirely flush with the table deck, but preferably it has a vertically-disposed strip or wall 11 (Figs. 1, 3 and 5), which extends along the edge 8, and is at about the table level at the rear end of the discharge edge 8 and is inclined upwardly, increasing in height forwardly until its front end connects to the air box of the rock discharge channel. Thus the spillage is free at the rear end of edge 8 of the table, but is slightly retarded with respect to the thickness of the bed increasingly forwardly along the edge 8 and upwardly across the table, over to the rock channel.

Figure 1:
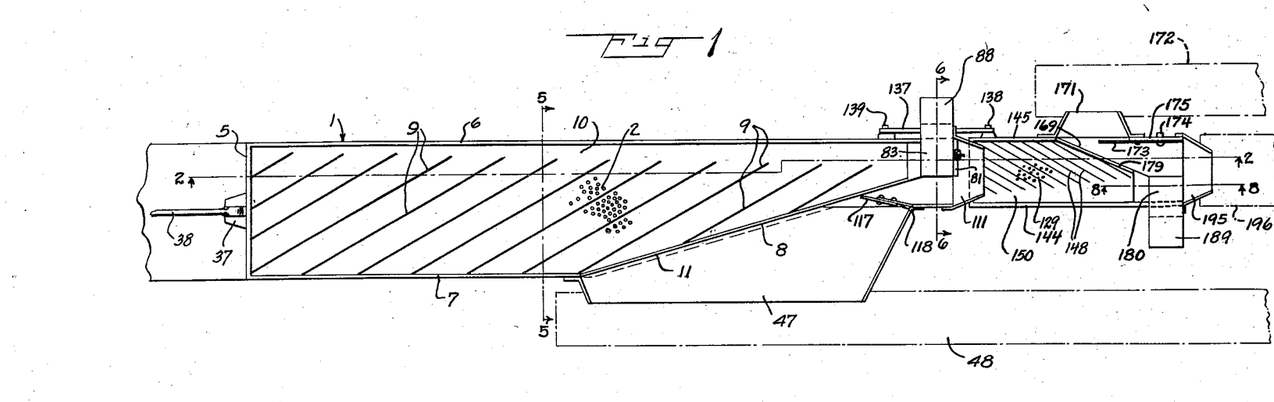
Fig. 1 is a top plan of a mechanism embodying the invention.

Upon the air-pervious deck or table 2 are provided separating partitions 9, which impel the settled heavier material out of the bed by the quickest and shortest path, the rear ends thereof abutting upon the rear bed-retaining wall 5 and upon the side bed-retaining wall 7, the partitions extending forwardly and transversely of the table, as shown in Fig. 1. The forward ends of the separating partitions terminate short of the bed-retaining wall 6 at the other side of the table, thereby leaving a longitudinally-disposed, unobstructed channel 10 along the inner side of the wall 6, and extending along the lower outer side edge of the bed of intermixed materials upon the table and being in the practical effect or operation outside of the bed. The bed or deck 2 is preferably inclined transversely upwardly from the side 7 toward the side 6, that is, upwardly in the direction in which the settled heavier material is impelled by friction and inertia and by the separating partitions into the channel 10.

Figure 2:
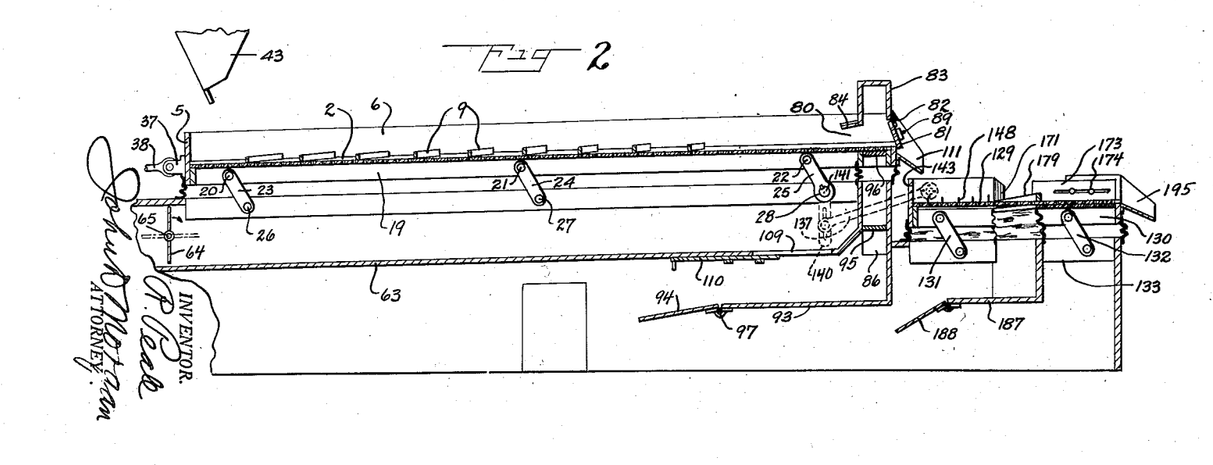
Fig. 2 is a central, vertical, longitudinal section taken on the line 2—2 of Fig. 1, and also showing a section of the feed hopper for feeding on the intermixed materials.

The table as described is arranged to be reciprocated longitudinally through a very short path, which is usually but an inch or two in length, this movement being utilized cooperatively to effect the forward progressive movement of the continuously maintained bed of materials. For this purpose, the frame 19, which extends along the edges of the bed, and is fixed to the lower parts of the side and end walls of the table, and constitutes the support of the air-pervious deck 2, is pivotally mounted at a plurality of points 20, 21 and 22 at either side of the table to a plurality of arms 23, 24 and 25, the lower ends of these arms being pivoted at 26, 27 and 28 to a framing fixed to and within the upper part of the stationary air chamber later to be described. The preferable reciprocation of the table through its short path is upwardly and forwardly and downwardly and rearwardly and for this purpose the pivoted supporting arms are upwardly and rearwardly inclined as best shown in Fig. 2. Any suitable means may be used for imparting the longitudinal reciprocation to the table, and as embodied a yoked bracket 37 is fixed to the rear end of the table and pivoted thereto is a connecting rod 38, connected to an eccentric 39, which is fixed on the shaft 40 of a belt-pulley 41, driven by a belt 42. The table may be also longitudinally inclined, as may be found most desirable or useful with different kinds of intermixed materials or with such materials in different physical conditions. The longitudinal inclination of the table may also be varied in degree or reversed in direction if found necessary or desirable, and such devices per se are well known in the art.

Means are provided for supplying the intermixed materials so as to build up upon the table a bed of the desired thickness and to thereafter maintain said bed as it slowly flows forwardly along the table and is gradually stratified and separated. A form of such means is shown fragmentarily and somewhat conventionally at 43 at the left-hand end of Fig. 2, and will be constructed so that the rate of feed may be varied as desired both to the entire table and relatively across the width of the table, so that a greater amount may be fed to one side or the other of the table, as may be found desirable or efficient. The particular form of this means may be widely varied and may be of the form shown in my co-pending application Ser. No. 183,262, filed April 13, 1927.

In the present preferred form of my invention both the coal and the impurities, or other lighter and heavier materials, are discharged at the front end of the table, the impurities after settling on the deck through stratification having been quickly removed from the bed to the side edge thereof very closely adjacent to the point where any particular part of the impurities comes to rest upon the deck, and is thenceforward impelled by friction and inertia and directed or constrained by the separating partitions into the separate side channel. The conveying devices cooperating with the discharged edge 8 for the coal comprises a downwardly-inclined chute 47, which directs the coal onto an endless belt-conveyor 48.

The means for producing the buoying or lifting air currents which are forced through the bed may be of any suitable form, and as shown a fan 59 blows a powerful current of air into a conduit 60, which discharges it into the stationary air chamber 61 beneath the table. A flexible closure 62 of canvas or other suitable material is connected to the lower edge of the vibratable table structure and to the upper edge of the stationary air chamber to constitute an air-tight enclosure therebetween. So far as concerns certain features of the invention the lifting and buoying air currents through the bed of intermixed materials may be of any desired form, but in accordance with certain aspects of my invention a pulsating air current is produced, and preferably therewith the deck or table 2 is of uniform perviosity throughout. This effects a pulsating buoying or lifting effect throughout the bed of intermixed materials. In the embodied form substantially the entire air chamber is divided into two horizontally disposed air chambers, one above the other, the lowermost of these chambers being in operative communication with the forward parts only of the table. For this purpose a medianly positioned and horizontally-disposed deck 63 extends from one side wall to the other of the air chamber, and divides the upper and lower parts of the air chamber, as already described and as best shown in Fig. 2. At the rear end of the upper part or passage of the air chamber, a butterfly valve or vane 64 is mounted on a horizontal axis 65, and is positioned and proportioned to close this upper passage when in its vertical position and to leave the passage substantially open when in a horizontal position. This valve 64 is preferably rotated and this may be done in any suitable manner, and as shown a belt-pulley 67 is fixed to the axis 65, and a belt 68 runs over this pulley and over a pulley 69, fixed on the shaft 40 of the table-vibrating mechanism. It will be understood that the form of actuating means both for the fan and the air current impulse-creating valve or like device may be widely varied as desired, any known or suitable form being used. Further means are preferably provided for regulating the pulsating air currents as between the upper and lower air chambers and correspondingly to the bed of materials, and for this purpose a gate 73 extends the full width of the air chamber, and is pivotally mounted by its shaft 74 at the rear end of the horizontal partition 63 of the air chamber, the gate thus extending backwardly into the conduit from the fan. The angular positioning of this gate will direct more or less of the current from the fan into either the upper or lower compartment of the air chamber. A suitable external handle 75 is fixed to shaft 74, with a cooperating positioning device 76 to position and hold gate 73 as desired.

Means are provided, preferably utilizing a part of the air current, to prevent any of the coal or other separated and flotant superior stratum from passing out with the settled heavier rock and other impurities, and utilizing also other cooperative means and devices for regulating the discharge of said impurities. As embodied, the rock channel 10 terminates, that is, has its discharge point, at the forward end of the table, and is provided with a regulating flapper gate 81, hinged at its upper end 82, to an airbox 83, disposed above the end of the passage and provided preferably with a rearwardly extending plate 84. This air box 83 (Figs. 1, 2, 5 and 6) constitutes a closed chamber above the refuse channel, with front and rear openings 80 in its walls, for the passage of the refuse stream between the sides of the air box, which rest on the deck. The regulably weighted flapper gate 81 is hinged as a closure for the front end of the passage through the bottom of air box 83.

A stream of air is supplied from the air chamber into the top part of air box 83, and is directed downwardly and rearwardly upon the material moving through the air box to discharge at this extreme forward end of the table. For this purpose, an offset conduit 86 (Figs. 1, 2 and 6) communicates with the air chamber and connects by a flexible closure 87 with a conduit 88, which discharges the air current downwardly into the upper part of the air box 83. A strong air current is thus blown into the top of the air box and thence out rearwardly against the forward end of the superior flotant stratum of coal. This air forms a barrier against any coal at this extreme forward end of the superior stratum passing into the air box and thence outwardly with the heavier material. The gate 81 may be regulably weighted, and for this purpose a pin 89 is fixed to the gate, and one or more weights may be hung thereon.

The embodied means within the air chamber for directing air into the conduit 86 for the air box, comprises a horizontally-disposed deck 93, extending across between the side walls at the forward end of the lower compartment of the air chamber. This deck or partition 93 has preferably at its rear end a horizontally-swingable, hinged gate 94, which may be positioned to direct more or less current into the air box 83. Gate 94 is fixed to a shaft 97, which has a handle 98 and a holding device 99, located outside the air chamber. The table or deck within the air box 83 is preferably air-impervious, and for this position air stopping plates 95 and 96 are provided.

It may be desirable and efficient in certain cases to regulate and vary the reciprocal and alternating pulsation of the air current between the upper and lower parts or passages in the air chamber, to vary the strength and extent of the alternating pulsations along the length of the bed. As embodied, for this purpose, at the forward end of the table an opening 109 is provided in the horizontal portion 63 and this opening is provided with a slidable gate 110. Thus, the air current and impulses through the lower compartment of the air chamber are directed to the second table and to the air box 83 of the first table, and by regulating the area of the opening 109 they may be directed in any degree desired to the forward end of the bed of materials.

Figure 3:
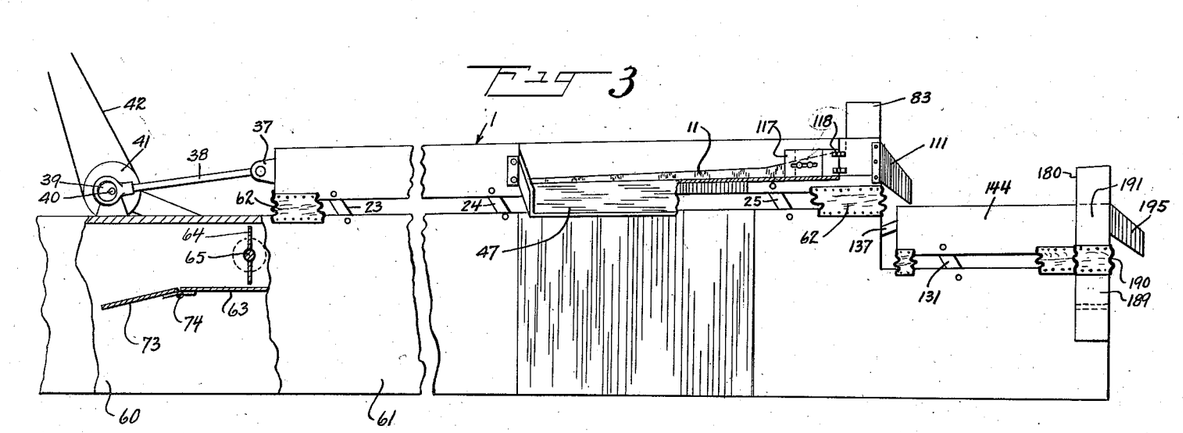
Fig. 3 is a broken side elevation of the mechanism shown in Fig. 1, looking toward the bottom side of that figure.
Figure 4:
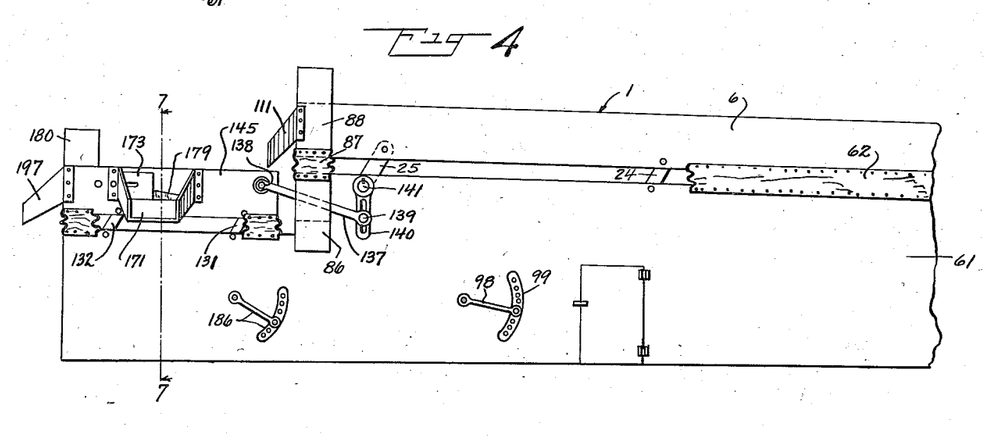
Fig. 4 is a fragmentary elevation of the opposite side from Fig. 3, and showing the fan, air-duct, air-controlling devices and table reciprocating means, part of which is broken off at the left of Fig. 3.

The impurities which have settled upon the table, have been impelled directly and sidewise out of the bed of materials into the side channel 10, and progressed forwardly therealong, are discharged through the gate 81 into a chute 111, and so far as the operation of this cleaning table is concerned, may be conveyed away by an endless conveyor belt or other suitable means. Where it is desired to separate out from the bed a material of intermediate specific gravity, such as "bony", suitable means are provided, and as shown (Figs. 1, 3 and 5) a vertically-disposed, angularly-positionable gate 117 is pivoted at 118, and is swingable to and fro to effect a separation in the materials at this point. This means when used is preferably located between the forward end of the coal spillage and the air box of the rock channel. This gate is preferably adjustable in length, and may be adjustable vertically if desired, and an exemplary longitudinal adjustment is shown in Figs. 1 and 3. The gate then has two side by side members, with a bolt and slot connection 119 therebetween. If desired this gate may be swung to extreme position against the air box 83 and thus shut off entirely the passage for the intermediate product when none is present, or no separation thereof is required.

So far as concerns the first table, its operation may be final upon the materials, and at many mines the coal separated by a single table has long been shipped and accepted by purchasers as clean coal meeting very definite high standards and requirements. It may be desirable with certain coals or other materials to effect a second and independent separating operation; I find this desirable, for instance, with run of mine coals having a very heavy percentage of impurities and where it is necessary or desirable to practically eliminate the total impurities from the product.

The problem to be solved, and the work to be done by this table, are markedly different than with the first table. This second table operates upon materials which consists predominantly of a heavier material with but a relatively small percentage component of a lighter material. This table is structurally and functionally widely different from the first table, but as a matter of convenience I connect the two tables mechanically to operate together, and also conveniently discharge material directly from the first table to the second. The second table has its deck preferably entirely differently inclined from the first table, and both the direction and amplitude of its path of reciprocation are also different.

Figure 7:
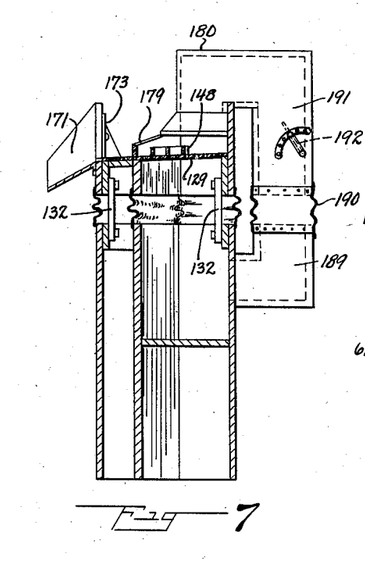
Fig. 7 is a transverse vertical section, in an enlarged scale, taken on the line 7—7 of Fig. 4.

One form of this table is shown in Figs. 1, 2, 3, 4, 7 and 8, and as there embodied the table comprises an air-pervious deck 129, which is inclined transversely upwardly from left to right (Fig. 7). The deck is mounted on a frame 130, which frame is reciprocably mounted on pairs of pivoted arms 131 and 132, at either side thereof, these arms at their lower ends being pivoted, respectively, to a frame 133 mounted in the top edges of a forward extension of the air chamber. This table is vibrated through a very short path, and the direction of vibration may be the reverse of that of the first table, and the length of the path of vibration may likewise be different and may be varied as desired. It is conveniently connected to be reciprocated by the common drive with the other table. As embodied, a connecting link 137 is pivoted at 138 to the second table, this link being connected at its other end by a pin-and-slot connection 139 to an arm 140, fixed to a shaft 141, which shaft is keyed to a pivoted arm 25 of the first table. Thus the second table vibrates in a different direction from the first table and through a path the length of which is independent of the length of path of vibration of the first table, and is variably regulable by means of the pin and slot connection 139.

Figure 8:
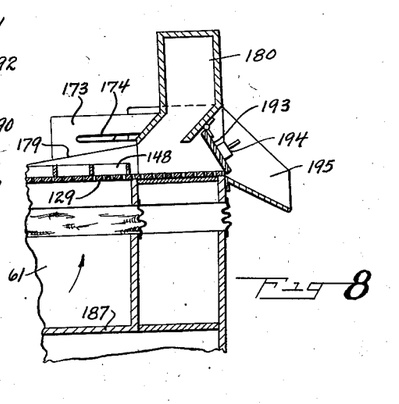
Fig. 8 is a longitudinal vertical section, taken on line 8—8 of Fig. 1.
Figures 9, 10:
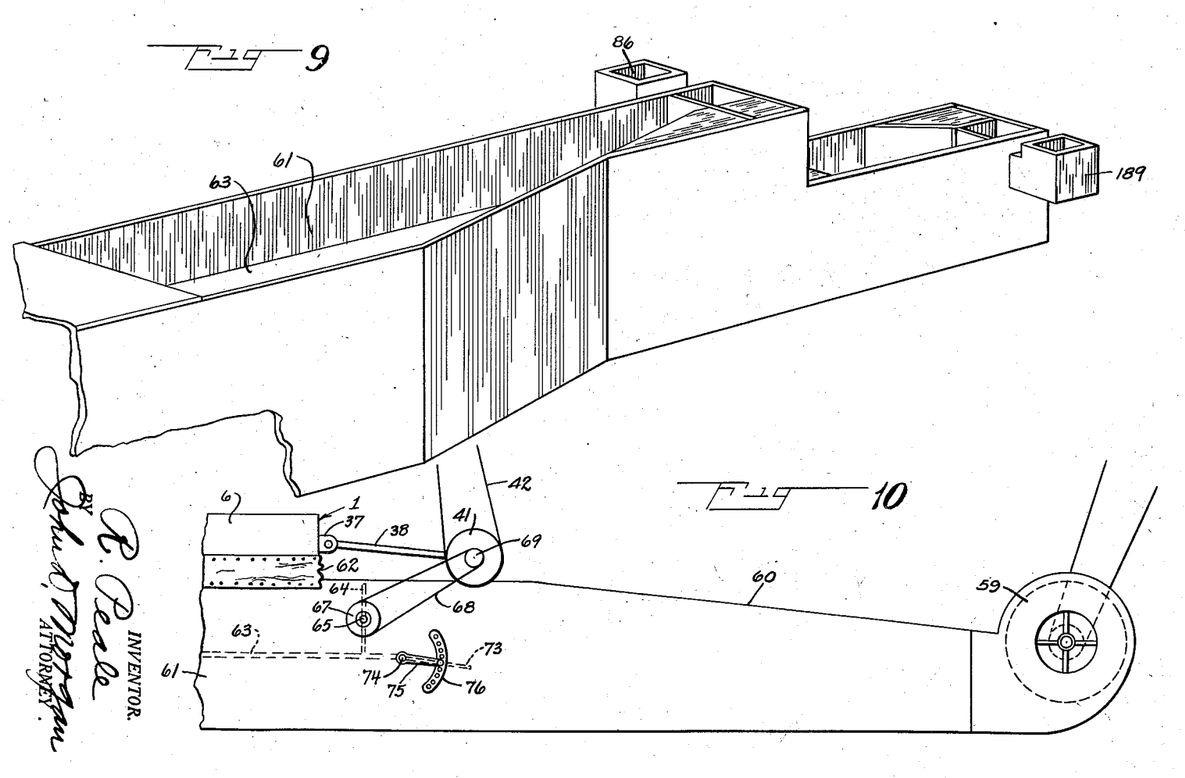
Fig. 9 is a detached, fragmentary, isometric view of the air chamber of Fig. 8.
Fig. 10 is a fragmentary side elevation joining substantially onto the right-hand end of Fig. 4.

The table is provided with a rear bed-retaining wall 143, and side bed-retaining walls 144 and 145, the rear end of this table being conveniently located beneath the chute 111 to receive the material discharged therefrom. This table is provided with separating partitions 148, which at their rear ends abut against the end retaining wall 143 and the side bed-retaining wall 145, the forward ends of the separating partitions terminating short of the side bed-retaining wall 144, to constitute a channel 150 for the heavier impurities. The forward end of this table is likewise obliquely disposed, so as to provide a relatively very extensive spillage or delivery edge at the forward end of the table, as shown at 169. This spillage edge may be provided with an upwardly projecting edge 179 increasing in height from the outside inwardly (as appears from Figs. 7 and 8), and terminates forwardly at the air box 180. The lighter and superior stratified material is delivered at the rear portion of this forward delivery or spillage edge 169 onto a chute 171, which in turn discharges onto an endless belt conveyor 172. There is preferably provided a vertically-disposed separating gate 173, variably positionable longitudinally to form a division between the lighter and heavier materials. This gate 173 has a bolt and slot connection 174 with a longitudinally disposed side wall 175 at the forward end of the table. At its forward end the table has a flapper gate regulated and air box equipped refuse discharge (Fig. 8). These may have the same construction, operate in the same manner, and are similarly positioned as in the first table, and need not be described in full detail.

As already indicated, air is supplied as a matter of convenience to the second table from the forward end of the first air chamber, and the proportionate air supplied to the forward and rear portions of this table, or to the table and its air box as the case may be, are regulated by suitable means such as a horizontally disposed partition 187 extending across between the side walls of the air chamber. Mounted at the rear end thereof is pivotally-mounted gate 188, which may be positioned to deliver more or less air both above and below the partition 187. It is preferably supplied with an actuating and positioning means 186 located outside the air chamber. Air is supplied to the box 180 by a conduit 189 opening out of the side wall near the forward end of the air chamber (Fig. 7) and communicating by a flexible connection 190 with a conduit 191, discharging into the top of the air box. A regulating valve 192 may be provided in this passage. This air box is preferably provided, as already indicated, with a flapper gate 193, having an adjustable weighting device 194. A chute 195 is provided at the forward end of the table, and is arranged to take the discharged material coming through and also passing alongside the air box 180. The chute discharges onto an endless conveyor belt 196.

In accordance with one feature of the invention, a final refuse product may be taken both through the channel way of the air box 180 and gate 193 and also from the forward end of the table outside of and alongside the air box and over the forward part of the spillage edge wall 179. These various devices at the forward end of the table may be variably regulated to cooperate together to widely vary the character or quality of the several separated discharged materials. The longitudinally slidable gate 173 may be variably longitudinally positionable to selectively separate the coal or other lightest material into chute 171 as nicely as may be desired. The action of flapper gate 193 may be regulated by its weights and the force of the air current through air box 180 may be regulated by valve 192 to regulate what passes through the air box channel and the gate and what goes into the intermediate channel between these and the gate 173. This gives a minute relative regulation of the three products.

Figure 11:
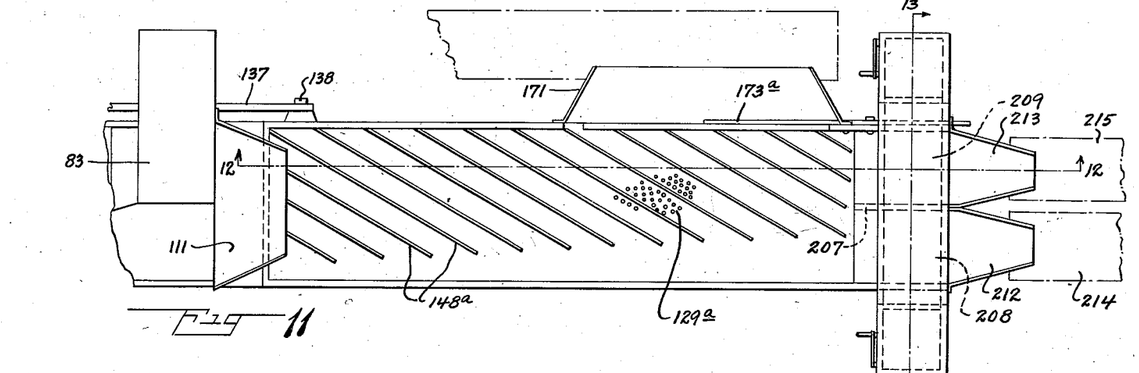
Fig. 11 is an enlarged plan view of a different form of the second table, shown at the right-hand end of Fig. 1.
Figure 12:
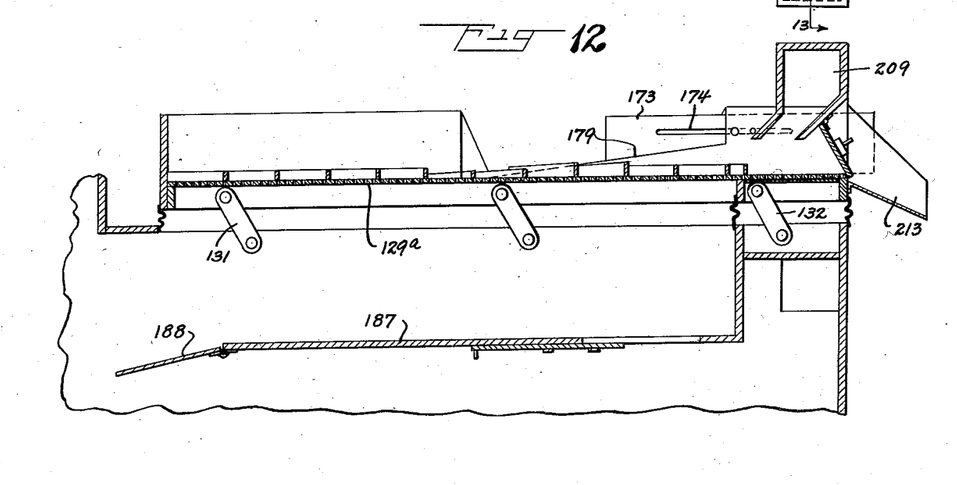
Fig. 12 is a vertical, longitudinal section on the line 12—12 of Fig. 11.
Figure 13:
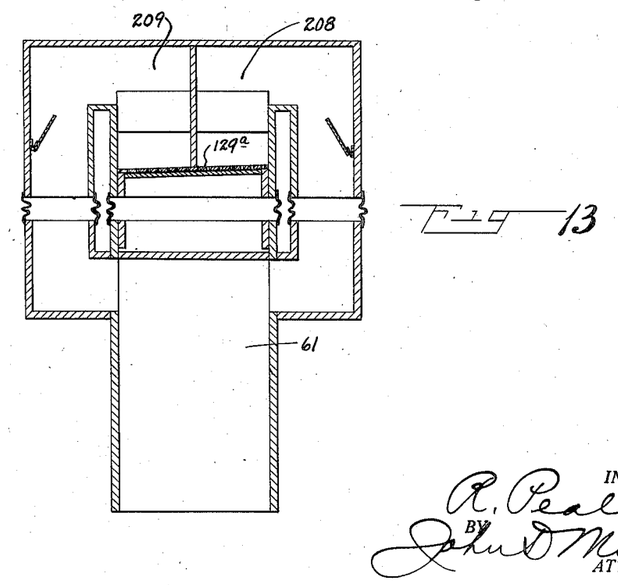
Fig. 13 is a vertical, transverse section taken on line 13—13 of Fig. 11.

In Figs. 11 and 12 a modified form of the second table is shown, in which the relatively small quantity of lighter material is discharged at the forward end of the side edge of the table, and the heavier refuse or other heavier material is discharged entirely across the front end of the table but an intermediate product is likewise separated from an ultimate heavier product. In this form a separating partition 207 is located longitudinally and medianly of the forward end of the table, dividing it into two channel ways each of these channel ways being provided with an air box 208 and 209, respectively, which in structure and operation may be similar to those previously described, and need not be again described in detail. These respective channel ways are provided with discharge chutes 212 and 213, which discharge their products respectively onto endless conveyor belts 214 and 215.

Figures 14, 15:
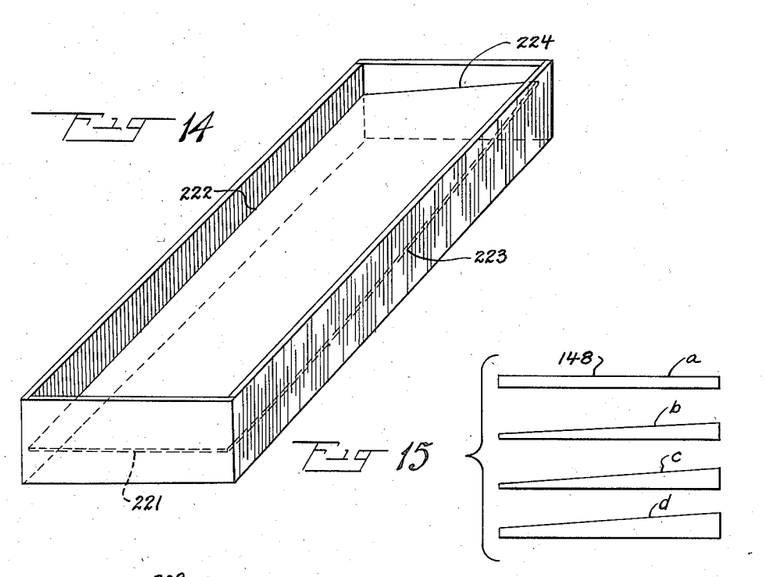
Fig. 14 is a diagrammatic perspective view showing the arrangement of the air-pervious table in Figs. 11 and 12.
Fig. 15 is a detached detail of the separating partitions.

The air pervious deck 129 or 129a, or both of them, may be of the form diagrammatically shown in Fig. 14. As here shown the rear end 221 of the air-pervious deck is substantially level transversely. The side edge 222 for the lighter material is sloped upwardly forwardly and the opposite edge 223 is sloped upwardly at a much greater degree, and the entire forward part of the deck is inclined upwardly transversely from left to right as shown in Fig. 14, and is clearly noted at the forward side edge 224 of the deck. On this form of air-pervious deck, the separating partitions 148a are inclined forwardly, transversely and upwardly with respect to the deck 129a, and may be of the various forms shown in Fig. 15. One present preferred arrangement of separating partitions for the forward table comprises most of the partitions of form a of Fig. 15 at the rear of the table, these forms gradually changing through b, and c to d, at the forward end of the table. The various partitions in this figure are showing as increasing gradually in height from the juncture with the end of side wall of the table toward the channel way.

Regulative selective action determining the relative character of the various materials discharged at the respective discharge points is effected between the lighter, heavier and intermediate product by means of the adjustable gate 173a, the weightings of the flapper gates and the regulation of the air current of the air boxes 208 and 209, as already described in connection with Figs. 1 to 8.

In accordance with one feature of the invention, any desired proportion of the settled refuse or other heavier material which has been separated from the bed and impelled into the side channel 10 may be discharged sidewise directly on said channel without traveling longitudinally to the front end of the table previously to being discharged therefrom. In connection with these auxiliary, table-side discharging devices for the settled heavier material, devices may be provided for regulating the amount of rock or other refuse to be discharged therefrom, and they may also be provided with an air check for preventing the discharge of any of the light material, stratified or unstratified, through these side discharge orifices. As embodied, openings 233 are provided in the side wall 6 of the table, and these may be provided with variably positionable slides or gates 234, having bolt-and-slot connections 235 with the side wall, whereby the gates may be moved to vary the height or area of the discharge orifices. These orifices discharge into closed channels 236, extending outwardly from the side wall of the table and provided respectively at their outer ends with vertically hung flapper gates 237 which may have variably weight regulations 238, very similar to those at the front end of the table. Into these closed channel ways 236 an air current is discharged through a top opening 340, which communicates with the air chamber or other suitable air pressure supplying means. These side wall auxiliary refuse discharging devices may discharge the material in any desired manner or to any desired place. As shown they discharge into a chute 241, connected to the table by supports 242, and emptying at its forward end 243 onto the second table, where this material may be given a further separation if desired.

The manner of operation is substantially as follows:—

The intermixed materials are fed onto the table so as to build up and maintain thereon a bed of such thickness as is most efficient for the particular materials being separated, or the physical condition of such materials, and with certain kinds of coal and intermixed impurities, a bed of about six to eight inches in thickness is maintained traveling slowly forwardly along the table and progressively undergoing stratification and separation, the separated materials being discharged from the forward end of the table. The hopper 43 is provided for this purpose with a variable-speed feeding mechanism, which may be of any suitable form. The table is longitudinally reciprocated, as already described, through a very short path, this with the present construction being a short upward and forward stroke and corresponding downward and backward stroke.

The air blast has preferably a pulsating lifting action through the bed, and the valve 64 is rotated at suitable speed. In the full line position of Fig. 2 it shuts off the air current from the upper compartment of the air chamber above the partition 63, but the lower partition is open to the air current. Thus in the upper part of the air chamber a pulsating air current is created rising to a maximum and then diminishing and substantially ceasing. The lower compartment of the air chamber, when the opening 109 is open, exerts a pulsating lifting action through the forward part of the bed, which rises to a maximum and decreases to a minimum, but does not entirely cease, and these two air actions reach a balance at some stage in their cycle intermediately of the length of the bed. When the opening 109 is closed, the air current through the lower compartment of the air chamber operates only on the air box of the first table and upon the second table. The gate 94 may be adjusted to apportion the air current in the lower compartment between the two tables.

The air current or lifting air force separates the pieces or particles of materials in the bed, and permits the heavier materials, such as the rock and impurities to settle on the bed, while the coal or other lighter material is buoyed upwardly and the stratifying is begun. The settled impurities are impelled forwardly through friction and inertia by the longitudinal reciprocation of the table and are constrained by the separating partitions in the shortest and most direct path outwardly to the upper side edge of the bed. They are progressed forwardly by friction and inertia substantially outside of the bed, additional impurities being similarly delivered at the side edge progressively forwardly along the table.

As the stratification and separation progresses, the upper flotant stratum of coal flows forwardly unconstrainedly along the bed, and is discharged from the forward end of the table, the discharge beginning at the lower side of the table substantially midway of the length of the bed. Thus the clean material is allowed to flow along an unconstrained path and to be discharged at a relatively very early point along the bed and in the progress of the separating operation. As the material progresses along the bed, the inclined wall at the spillage edge 8 tends to prevent direct discharge from the level of the table and this effect increases transversely forwardly along and across the table as the stratum of superior flotant material becomes thinner due to the discharge of a fairly large portion thereof from the front of and farther back along the bed.

Where an intermediate product is to be separated, as for instance where the "bony" is to be separated, the gate 117 may be both angularly and longitudinally positioned so as to effect a practically accurate separation between the entirely clean coal and the "bony". The clean coal is directed by the chute 47 onto the conveyor belt 8 and may be conducted directly to the railway car. The "bony" is conveyed by a chute 111 direct to the second table, when that table is conveniently operated in mechanical connection with the first table. The rock and other impurities from the channelway 10, which have progressed along the edge of the bed are directed into the rock passage way at the front of the table, and here the downwardly impinging air current from the top of the air box 83 strikes it, and the air is then forced rearwardly under the deflector 84, tending to hold back and to throw back into the bed any stray fragments of coal which might possibly still be intermixed with the top of the layer of rock. The reciprocation of the table, and the weighting of the gate 81 regulates the pressure on the rock stream, which is discharged at a rate to eject all of the rock and other impurities and none of the coal into the chute 111.

The selective regulation of the kind and proportion of materials operated on by the first table which shall undergo a further operation is determinable by the attendant, through the setting of the gate 117, the weighting of the gate 81 and the regulation of the force or intensity of the air pressure in the air box 83. Thus the quantity and character of materials to be further operated on is selectively determined through a wide range and to a very accurate degree of differentiation.

The second table, as a matter of mechanical convenience, is located to receive the desired materials from the first table, and is mechanically connected to be operated therefrom, although the extent and direction of reciprocation of the table may be and usually is very different from that of the front table and will be regulated and set entirely to the most efficient action of the second table. The air action on the second table is likewise entirely independently regulable in its intensity and in its direction in various parts of the second table, by means of the setting of the gates 94 and 188.

This table has its air-pervious deck preferably level at its rear or receiving end and is inclined both upwardly and also transversely, as is best shown in Fig. 14, so that the entire table inclines upwardly and forwardly, and is also inclined increasingly forwardly from left to right, as best seen in Figs. 1, 2 and 14.

The arrangement and operation of this table is very different from that of the first table, as the problem here is to separate an exceedingly small relative proportion of light materials from a great mass of heavier materials, whereas on the first table the problem is practically the reverse of this.

The separating partitions in the second table, as already described, increase both in height and bevel from the left-hand or lower side of the table and also forwardly longitudinally of the table, as best shown in Fig. 15, and the stratified and separated materials are delivered from the front end of the table. The heavier impurities are impelled by friction and inertia and by the action of the separating partitions into the channel 150, and pass through the air box 180 and the regulating gate 193 from the front end of the table and into the delivery chute 195. The checking air action in the box 180, and the weighting of gate 193 will be regulated as already described. An accurate separation between the lighter materials and an intermediate heavier or refuse material is effected in this table by means of the longitudinal positioning of the gate 173 and the weighting of the gate 193, the so separated lighter material being delivered from the chute 171 and all of the refuse being directed into the chute 195.

The accurate and complete separation desired may be further attained in some cases, by the use of the air box 209 on the discharge channel for the intermediate materials.

Figure 16:
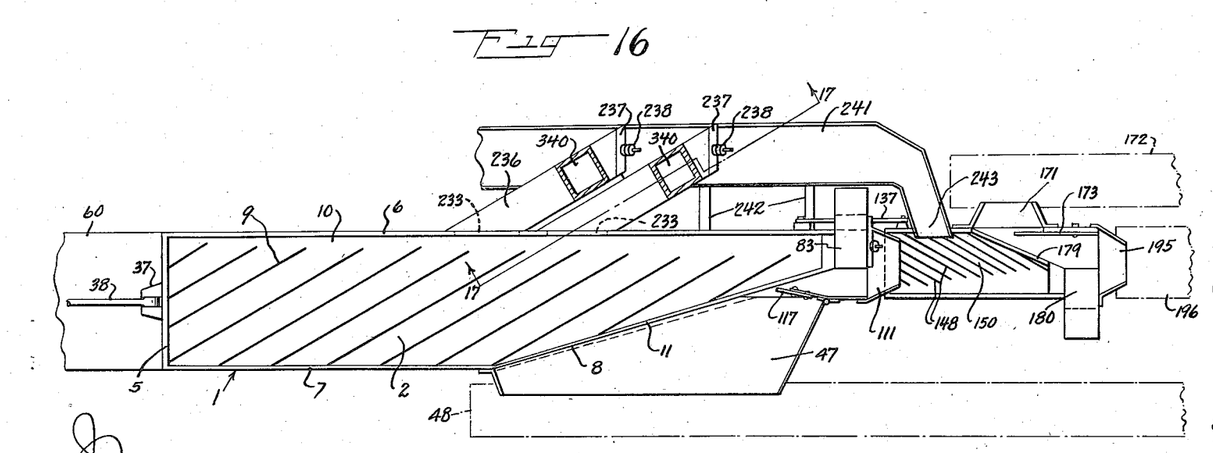
Fig. 16 is a top plan showing a modified form of the table.
Figure 17:
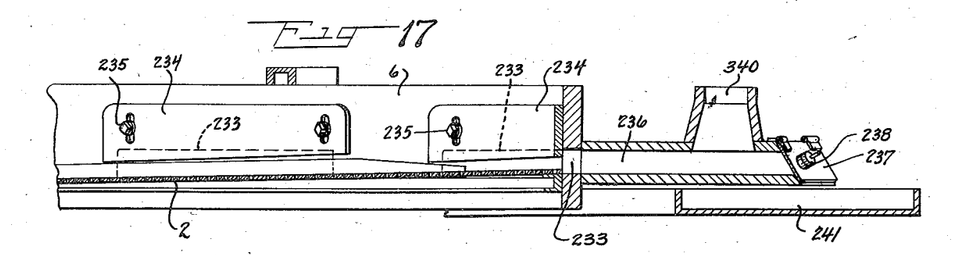
Fig. 17 is an enlarged vertical section on line 17—17 of Fig. 16.

The operation of the modified form shown in Figs. 16 and 17 will be understood from the preceding description given in connection with those figures.

The invention in its broader aspects is not limited to the specific mechanisms shown and described but departures may be made therefrom within the scope of the accompanying claims without departing from the principles of the invention and without sacrificing its chief advantages.

What I claim is:—

1. A mechanism for separating intermixed divided materials varying relatively very greatly in size of particles or fragments but varying relatively very little in the specific gravities of the materials, including in combination an air pervious table, means for maintaining thereon a continuous, forwardly moving bed of materials progressively undergoing separation, means for longitudinally reciprocating the table, and means for creating a differential pulsating air action longitudinally of the bed, said means comprising an air chamber beneath the table, a horizontally disposed partition separating the air chamber into upper and lower compartments, the compartments communicating at each end of the chamber, and means for blowing an intermittently operating air current into one compartment of the air chamber.

2. A mechanism for separating intermixed divided materials varying relatively very greatly in size of particles or fragments but varying relatively very little in the specific gravities of the materials, including in combination an air pervious table, means for maintaining thereon a forwardly moving bed of materials progressively undergoing stratification, means for stratifying and separating the materials comprising devices for forcing air through the bed and longitudinally reciprocating the table, a second table having means for separating materials and means for selectively delivering certain materials from the first table to the second and means for reciprocating said table independently of said first table as to direction and length of said reciprocation.

3. A mechanism for separating intermixed divided materials varying relatively very greatly in size of particles or fragments but varying relatively very little in the specific gravities of the materials, including in combination an air pervious table, means for maintaining thereon a continuous, forwardly moving bed of materials progressively undergoing separation, and means for creating a differential pulsating air action longitudinally of the bed, said means comprising an air chamber beneath the table, a horizontally disposed partition separating the air chamber into upper and lower compartments, the compartments communicating at each end of the chamber, and means for blowing an intermittently operating air current into one compartment of the air chamber.

RICHARD PEALE.